United States Patent
Yasrebi et al.

(10) Patent No.: US 8,275,891 B2
(45) Date of Patent: Sep. 25, 2012

(54) METHOD AND APPARATUS FOR SOCIAL NETWORKING IN A DYNAMIC ENVIRONMENT

(75) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 549 days.

(21) Appl. No.: 12/505,884

(22) Filed: Jul. 20, 2009

(65) Prior Publication Data

US 2011/0016399 A1    Jan. 20, 2011

(51) Int. Cl.
*G06F 15/16*    (2006.01)
(52) U.S. Cl. ............... 709/227; 705/319; 455/554.2
(58) Field of Classification Search .......... 709/227; 705/319; 455/554.2
See application file for complete search history.

(56) References Cited

U.S. PATENT DOCUMENTS

| | | | |
|---|---|---|---|
| 5,884,272 A * | 3/1999 | Walker et al. | 705/319 |
| 2004/0230683 A1* | 11/2004 | Adamczyk et al. | 709/227 |
| 2007/0161402 A1* | 7/2007 | Ng. et al. | 455/554.2 |
| 2008/0140650 A1* | 6/2008 | Stackpole | 707/5 |
| 2008/0310307 A1* | 12/2008 | Yeom | 370/235 |

* cited by examiner

*Primary Examiner* — Moustafa M Meky
*Assistant Examiner* — Michael C Lai (57) ABSTRACT

In one embodiment, the present invention is a method and apparatus for social networking in a dynamic environment. In one embodiment, a method for social networking in a network includes broadcasting a first set of one or more keywords representing one or more interests of a first user in the network, receiving a response from a second user in the network indicating interest in at least one of the interests of the first user, and connecting to a server in the network, where the server hosts a group for supporting communications between at least the first network user and the second network user.

20 Claims, 5 Drawing Sheets

METHOD AND APPARATUS FOR SOCIAL NETWORKING IN A DYNAMIC ENVIRONMENT

FIELD OF THE INVENTION

The present invention relates generally to social networking and relates more particularly to social networking in networks with dynamic topology.

Social networks, which are logical sets of devices whose users may communicate to form groups based on common interests, have exploded in popularity in recent years. Despite this, it remains difficult to identify anonymous peers who share common interests in public environments. For example, individuals may wish to identify like-minded peers within their vicinity and with whom they can communicate (e.g., using instant messaging or other communication services).

SUMMARY OF THE INVENTION

In one embodiment, the present invention is a method and apparatus for social networking in a dynamic environment. In one embodiment, a method for social networking in a network includes broadcasting a first set of one or more keywords representing one or more interests of a first user in the network, receiving a response from a second user in the network indicating interest in at least one of the interests of the first user, and connecting to a server in the network, where the server hosts a group for supporting communications between at least the first network user and the second network user.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention is a method and apparatus for dynamic social networking. Embodiments of the present invention provide a means of establishing social networking services in networks in which devices join and leave dynamically (and may receive Internet Protocol (IP) addresses dynamically as well).

Figure 1:
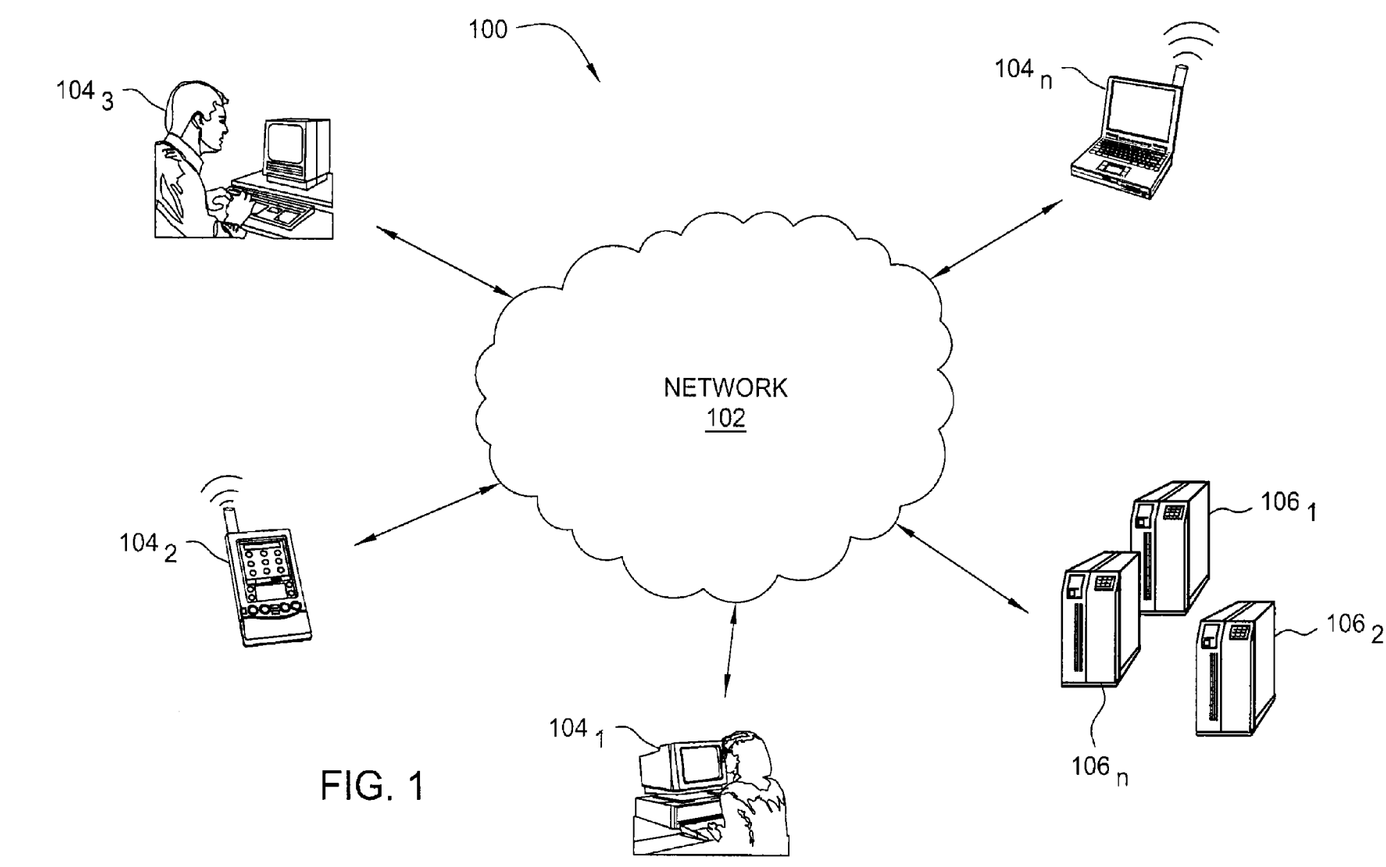
FIG. 1 is a schematic diagram illustrating one embodiment of a system within which the present invention may be implemented.

FIG. 1 is a schematic diagram illustrating one embodiment of a system 100 within which the present invention may be implemented. As illustrated, a plurality of devices, including user devices $104_1$-$104_n$ (hereinafter collectively referred to as "user devices 104") and servers $106_1$-$106_n$ (hereinafter collectively referred to as "servers 106") are connected to and may communicate with each other over a network 102. The network 102 may be, for example, a local area network (LAN), a wireless network, a cellular network, and the like.

The user devices 104 may include one or more of desktop computers, laptop computers, tablet computers, cellular telephones, personal digital assistants, global positioning systems (GPS), gaming consoles, handheld gaming devices, Internet Protocol television (IPTV), Voice over Internet Protocol (VoIP) telephones, and the like. As such, each of the user devices 104 may be a mobile device (e.g., such as a cellular telephone), or may remain in substantially the same physical location for extended periods of time (e.g., such as a desktop computer). The servers 106 are devices capable of hosting services that may be used by the user devices 104. In one embodiment, at least some of the user devices 104 also function as servers. In another embodiment, the LAN gateway device (not shown) may participate in the protocol exchange regarding establishment of the social network and may server as a host server 106.

Moreover, the connection of each of the user devices 104 to the network 102 may change dynamically. That is, any given user device 104 may connect to or disconnect from the network 102 dynamically. As such, the IP addresses for the user devices 104 may also be assigned or changed by the network dynamically. In some embodiments, dynamic assignment of IP addresses renders the user of a given user device 104 substantially anonymous. In one embodiment, one or more of the user devices 104 may connect to the network 102 via a local area network (LAN) (not shown). In another embodiment, the user devices 104 may connect to the network 102 directly.

One or more of the users operating the user devices 104 may share common interests, but may be unaware that other users share these common interests. As such, a given user may wish to identify other users in the network 102 who share his or her interests and to communicate with these other users regarding the shared interests.

Figure 2:
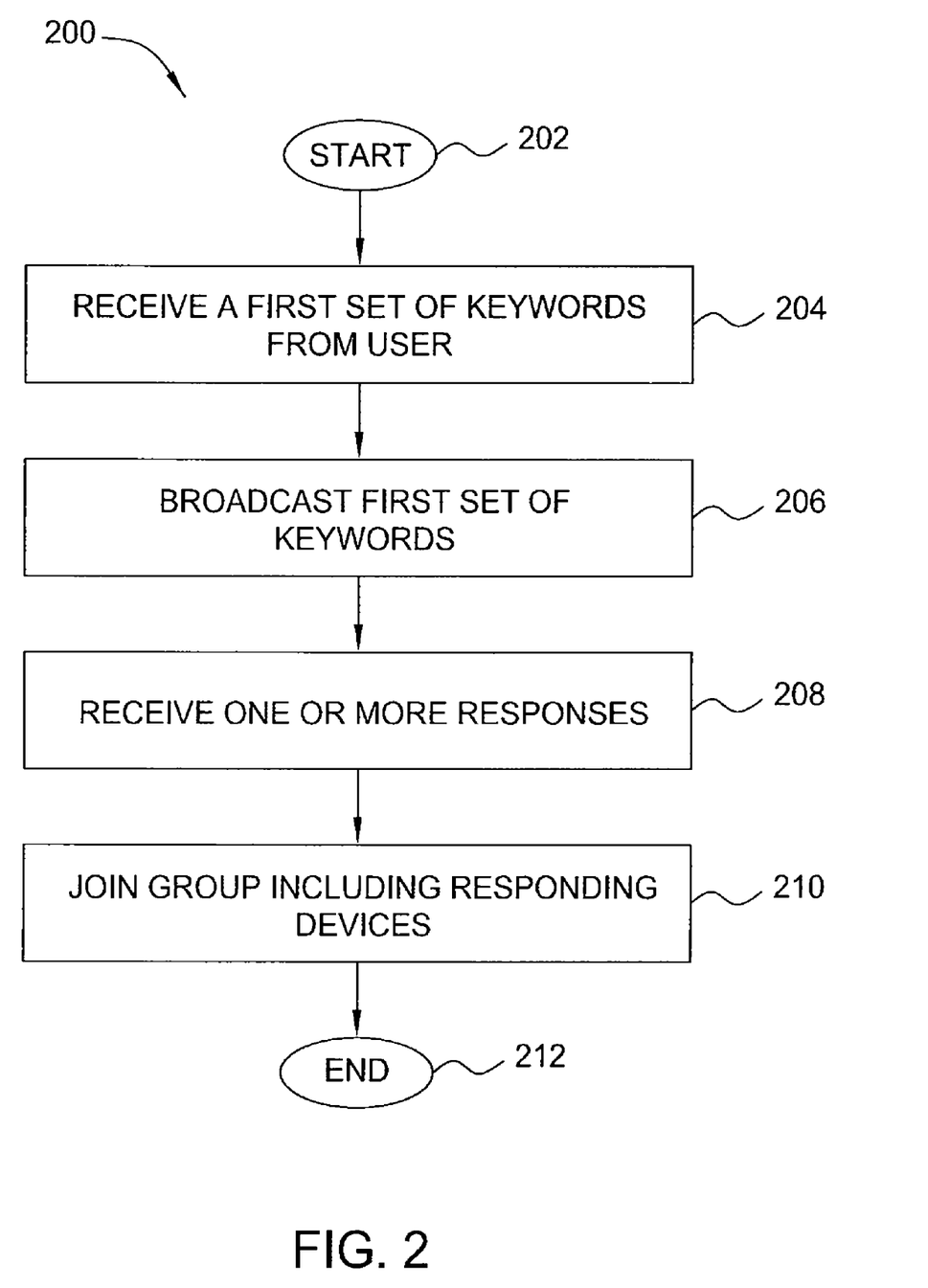
FIG. 2 is a flow diagram illustrating one embodiment of a method for social networking in a dynamic environment, according to one embodiment of the present invention.

FIG. 2 is a flow diagram illustrating one embodiment of a method 200 for social networking in a dynamic environment, according to one embodiment of the present invention. Specifically, the method 200 represents one embodiment of a method for dynamically identifying network users who share a common interest and creating a hosted group in which the users can exchange communications that may be related to the common interest. For example, the method 200 is started on a user's machine or device, and operates on a well-known transmission control protocol (TCP) or user datagram protocol (UDP) port. For example, the method 200 may be implemented by any of the user devices 104 illustrated in FIG. 1. As such, description of the method 200 will make reference to several of the system components described above; however, it is to be understood that the method 200 is not limited to the specific implementation of the system 100.

The method 200 is initialized at step 202 and proceeds to step 204, where a first user device 104 receives a first set of one or more keywords from a user operating the first user device 104. For instance, the first user may be operating a mobile telephone in a public place, such as a coffee shop. In one embodiment, the first set of keywords comprises keywords that represent one or more interests of the user operating the first user device 104. For instance, the first set of keywords may include the keywords "rock music" and "concerts." The first set of keywords may be provided in a number of ways. For example, the keywords can be provided interactively, each time the user operating the first user device 104 is interested in exploring participation in a social network. The keywords can also be pre-defined, for example based on the time of day, the location of the first user device 104 (e.g., using a GPS), and/or user profile data (which may be dynamically or statically read by the method 200 from sources including an Internet database, a multimedia service provider such as a television football package subscription, an Internet service provider that maintains a history of a user's Internet searches, a program on the first user device 104 that harvests data about user interests, or other sources).

In step 206, the first user device 104 broadcasts the first set of keywords to one or more other user devices 104 in the network 102. In one embodiment, the first set of keywords is broadcasted upon the command of the user operating the first user device. The user operating the first user device 104 may wish, for example, to locate other users on the network 102 who wish to participate in communications related to the interests indicated by the first set of keywords (e.g., rock music and concerts, following the example provided above). In one embodiment, the broadcast also includes a proposed server selection algorithm for selecting a server 106 to host communications for a group of responding user devices 104. In one embodiment, the proposed server selection algorithm is a default algorithm. In a further embodiment, the broadcast also includes an indication as to whether the first user device 104 can host the communications as a server 106.

In one embodiment, any one of a number of protocols may be used to broadcast the first set of keywords. For instance, in one embodiment, the actual LAN IP broadcast IP address of all ones (i.e., the 1111 . . . 11 IP address) is used. In another embodiment, other protocol techniques such as IP multicast may be used at the network level. An exemplary implementation protocol may include the following fields: Sender IP Address|Recipient IP Address|Sender Port|Recipient Port|Message_Type|Message-Type-Specific_Data. Some of this data appears in different protocol layers. In addition, various Message_Types can be used, and extensions are possible depending on the choice of details used in implementing the protocol. Exemplary Message_Types may include, for example: Locate_Service, I_Can_Serve, I_Am_Leaving_The_Group, Request_To_Join_Group, You_Can_Join, and I_Am_The_Server_For_Group. Other Message_Types are possible depending on the implementation.

In step 208, the first user device 104 receives one or more responses from one or more responding user devices 104. For example a responding user device 104 may be a personal digital assistant operated by another individual sitting in the coffee shop. The responses indicate that the users operating the responding user devices 104 wish to participate in communications related to the interests indicated by one or more of the keywords in the first set of keywords. In one embodiment, the response includes a second set of one or more keywords that represent one or more interests of the user operating the responding user device 104. For example, the second set of keywords may be identical to the first set of keywords, may be a subset of the first set of keywords (i.e., less than all of the first set of keywords), or may be a superset of the first set of keywords (i.e., more than all of the first set of keywords). For instance, following the above example, the second set of keywords may include the keywords "rock music" and "festivals." The second sets of keywords may be provided to their respective user devices 104 in any of the manners described above in connection with the first set of keywords. In one embodiment, the response also includes the IP address and port on the responding user device 104 that are reserved for communications related to the interests indicated by the first and/or second set of keywords. In a further embodiment, the response also includes an indication as to whether the responding user device 104 is already hosting communications related to the interests indicated by the first and/or second set of keywords, or similar communications.

In step 210, the first user device 104 joins a group (e.g., a social network) comprising the responding user devices 104. In one embodiment, the first user device 104 joins the group under the explicit direction of the user operating the first user device 104. In another embodiment, the first user device 104 joins the group automatically upon receiving the responses. In one embodiment, the first user device joins the group by using the server selection algorithm proposed in step 206 to uniquely identify and connect to the server 106 hosting the group. The method 200 then terminates in step 212, as the first user device 104 is able to communicate with the responding user devices 104 in the hosted group.

Figure 3:
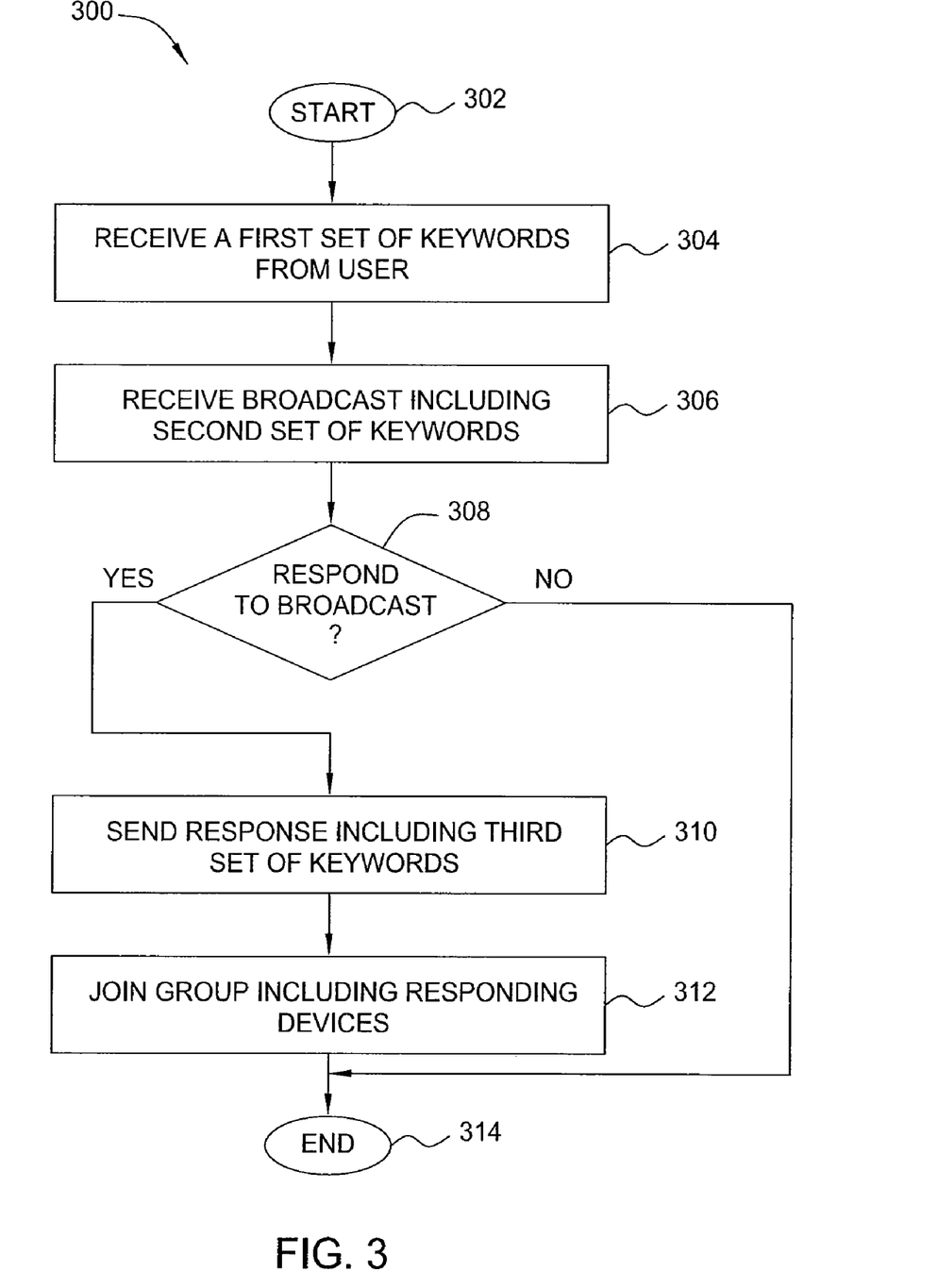
FIG. 3 is a flow diagram illustrating a second embodiment of a method for social networking in a dynamic environment, according to one embodiment of the present invention.

FIG. 3 is a flow diagram illustrating a second embodiment of a method 300 for social networking in a dynamic environment, according to one embodiment of the present invention. Specifically, the method 300 represents a second embodiment of a method for dynamically identifying network users who share a common interest and creating a hosted group in which the users can exchange communications that may be related to the common interest. Like the method 200, the method 300 is started on a user's machine or device, and operates on a well-known TCP or UDP port. For example, method 300 may be implemented by any of the user devices 104 illustrated in FIG. 1. As such, description of the method 300 will make reference to several of the system components described above; however, it is to be understood that the method 300 is not limited to the specific implementation of the system 100.

The method 300 is initialized at step 302 and proceeds to step 304, where a first user device 104 receives a first set of one or more keywords from a user operating the first user device 104. For instance, the first user may be operating a personal digital assistant in a public place, such as a coffee shop. In one embodiment, the first set of keywords comprises keywords that represent one or more interests of the user operating the first user device 104. For example, the first set of keywords may include the keywords "rock music," "festivals," and "New York." The keywords may be provided in any of the manners described above in connection with the method 200.

In step 306, the first user device 104 receives a broadcast from a second user device 104. The second user device 104 may be, for example, a mobile telephone operated by another individual sitting in the coffee shop. In one embodiment, the broadcast includes a second set of keywords that represent one or more interests of the user operating the second user device 104. For instance, the second set of keywords may include the keywords "rock music" and "concerts." The second sets of keywords may be provided to their respective user devices 104 in any of the manners described above in connection with the method 200. In one embodiment, the broadcast also includes a proposed server selection algorithm for selecting a server 106 to host communications for a group of user devices 104 interested in communicating with each other regarding the interests indicated by the second set of keywords. In one embodiment, the proposed server selection algorithm is a default algorithm. In a further embodiment, the broadcast also includes an indication as to whether the second user device 104 can host the communications.

In step 308, the first user device 104 determines whether to respond to the broadcast. In one embodiment, the first user device makes this determination in accordance with an explicit instruction from a user operating the first user device (e.g., the user affirmatively indicates that he/she wishes to join the group by pushing a button or giving some other indication). In another embodiment, the first user device makes this determination automatically, for example in accordance with a matching algorithm that compares the first set of keywords to the second set of keywords. If the first set of keywords and the second set of keywords meet some match threshold (e.g., a minimum number of matched keywords), then the first user device 104 may wish to respond to the broadcast. In one embodiment, the keyword matching algorithm may include approximations such as determinations of related concepts, synonyms, variations of words, and/or other schemes.

If the first user device concludes in step 308 that it should not respond to the broadcast (e.g., the first and second sets of keywords do not meet a match threshold), the method 300 simply terminates in step 314 without sending a response.

Alternatively, if the first user device concludes in step 308 that it should respond to the broadcast (e.g., the first and second sets of keywords do meet a match threshold), then the method 300 proceeds to step 310, where the first user device sends a response to the second user device. The response indicates that the user operating the first user device 104 wishes to participate in communications related to the interests indicated by the second set of keywords. In one embodiment, the response includes a third set of one or more keywords that represent at least one or more interests of the user operating the first user device 104. For example, the third set of keywords may be identical to the second set of keywords, may be a subset of the second set of keywords (i.e., less than all of the second set of keywords), or may be a superset of the second set of keywords (i.e., more than all of the second set of keywords, possibly including keywords from the first set of keywords). For instance, continuing the above example, the third set of keywords may include the keywords "rock music" and "festivals." In one embodiment, the response also includes the IP address and port on the first user device 104 that are reserved for communications related to the interests indicated by the second and/or third set of keywords. In a further embodiment, the response also includes an indication as to whether the first user device 104 is already hosting communications related to the interests indicated by the second and/or third set of keywords, or similar communications.

In step 312, the first user device 104 joins a group (e.g., a social network) comprising at least the second user device (and possibly other user devices 104 responding to the second user device's broadcast). In one embodiment, the first user device joins the group by using the server selection algorithm proposed in the second user device's broadcast to uniquely identify and connect to the server 106 hosting the group. The method 300 then terminates in step 314, as the first user device 104 is able to communicate with the user devices 104 in the hosted group.

Thus, the methods 200 and 300 operating together allow users in a network such as the network 102 to identify and to communicate with other users who share common interests. In this way, social networking is enabled in a manner that allows groups of users sharing common interests to be dynamically created and hosted at substantially any time. Users may create, join, and leave social networks dynamically on a network with dynamic and/or static IP addresses. Moreover, embodiments of the present invention allow users to remain substantially anonymous (e.g., by using dynamic IP addresses on open wireless networks). Anonymity can be preserved as long as the network does not require credentials from its users (e.g., free wireless network hotspot servers are available in many areas) or as long as the network service provider does not use or divulge its users' credentials (e.g., the credentials are used only for payment for services).

Figure 4:
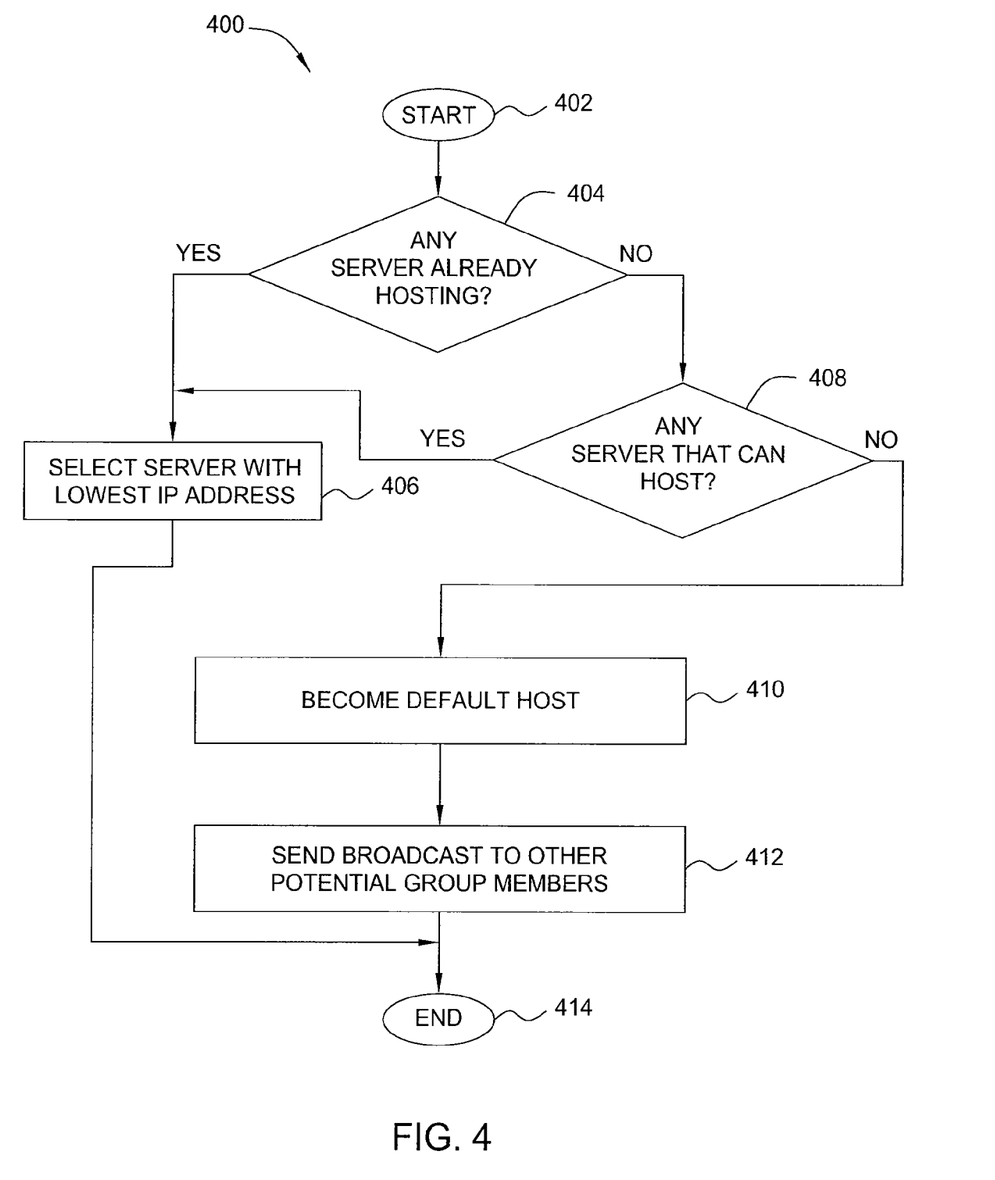
FIG. 4 is a flow diagram illustrating one embodiment of a method for choosing a server to host a group of network users, according to one embodiment of the present invention.

FIG. 4 is a flow diagram illustrating one embodiment of a method 400 for choosing a server to host a group of network users, according to the present invention. The method 400 may be implemented, for example, in accordance with step 210 of the method 200 or step 312 of the method 300 in order to uniquely identify the server hosting the group. That is, any user device seeking to join a group may use the method 400 in order to determine which server is hosting the group. As such, description of the method 400 will make reference to several of the system components described above; however, it is to be understood that the method 400 is not limited to the specific implementation of the system 100.

The method 400 is initialized at step 402 and proceeds to step 404, where a first user device 104 determines whether any servers 106 in the network 102 are already hosting a relevant group (i.e., a group that relates to the interests indicated by the keywords on which the first user device 104 is seeking to base a group). This determination may be based on the responses the first user device 104 has received to a keyword broadcast (e.g., as discussed with respect to step 208 of the method 200). For instance, another user device 104 may have responded that it is interested in a group based on the first user device's keyword broadcast and that it is already hosting such a group (or a similar group).

If the first user device 104 concludes in step 404 that at least one server 106 in the network 102 is already hosting a relevant group, the method 400 proceeds to step 406, where the first user device 104 selects a server 106. In one embodiment, the server 106 with the lowest IP address that is hosting a relevant group is selected. In other embodiments, however, different criteria or methods for selecting a server 106 are applied.

Alternatively, if the first user device 104 concludes in step 404 that there are no servers 106 in the network 102 that are already hosting a relevant group, the method 400 proceeds to step 408, where the first user device 104 determines whether any servers 106 in the network 102 can host a relevant group. Again, this determination may be based on the responses the first user device 104 has received to its keyword broadcast. For instance, another user device 104 may have responded that it is interested in a group based on the first user device's keyword broadcast and that it can host such a group. Furthermore, in one embodiment, the LAN gateway device or some other non-user device (referred to herein as an "SP server") may respond to such broadcast inquiries such that the SP server can host such social groups. In this embodiment, the SP server (e.g., a wireless LAN gateway access point) may be provided by the LAN service provider, which offers such social networking service on its network.

If the first user device 104 concludes in step 408 that at least one server 106 in the network 102 can host the relevant group, the method 400 proceeds to step 406, where the first user device 104 selects the server 106 with the lowest IP address that can host the relevant group.

Alternatively, if the first user device 104 concludes in step 408 that there are no servers 106 in the network 102 that can host the relevant group, the method 400 proceeds to step 410, where the first user device 104 becomes the default host of the relevant group. In step 412, the first user device sends a broadcast to all other user devices 104 that have expressed interest in joining the group. The broadcast indicates that the first user device 104 can and is hosting the group. In one embodiment, if a broadcast message is sent to a user device 104 that has not expressed an interest in joining the group, the receiving user device 104 ignores the broadcast. The method 400 then terminates in step 414, as all interested user devices 104 will join the relevant group through the first user device 104.

In the event of a service disruption (e.g., the server 106 hosting the group leaves the network 102 or crashes), the method 400 may be restarted in order to select a new server 106 to host the group (if one is available). In one embodiment, participating programs share a hosted database (at various intervals) in order to maintain continuity of service data (e.g., up to the last sharing point), in case a server 106 hosting a group leaves the network 102. In one embodiment of such a database sharing scheme, preference can be given to back-up hosting servers 106 having the most recent back-up data (e.g., a response indicating that a server 106 can host a group may include a parameter that indicates the age of the back-up data, such as a timestamp). In this embodiment, a method for selecting a server 106 to host a group may be modified to account for this parameter.

Although the methods 200-400 describe the sending and comparing of keywords as being performed locally by user devices, those skilled in the art will appreciate that at least a portion of this functionality may be performed by a remote device such as a remote server. For instance, users could store profiles on the remote device, where the profiles include keywords related to the respective users' interests. Keyword broadcasts may then be directed to the remote device, which compares the broadcasts to the stored profiles in order to determine keyword matches.

Figure 5:
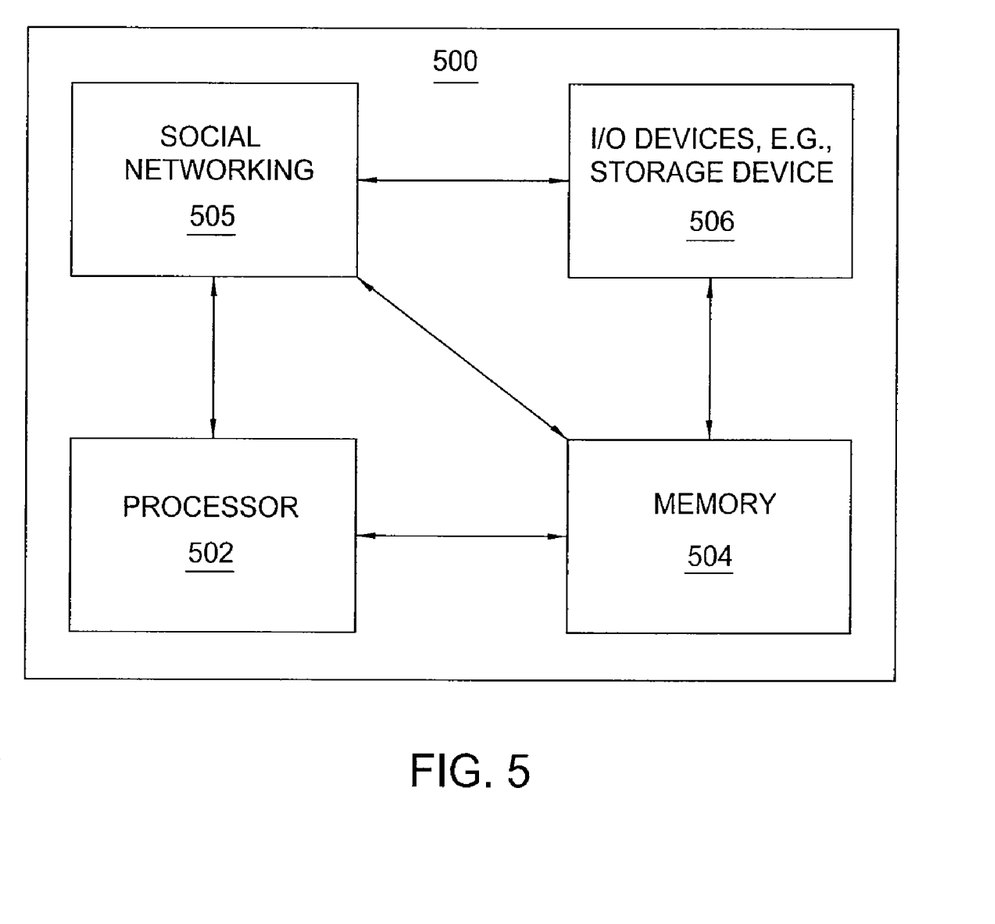
FIG. 5 is a high level block diagram of the social networking method that is implemented using a general purpose computing device.

FIG. 5 is a high level block diagram of the social networking method that is implemented using a general purpose computing device 500. In one embodiment, a general purpose computing device 500 comprises a processor 502, a memory 504, a social networking module 505 and various input/output (I/O) devices 506 such as a display, a keyboard, a mouse, a modem, and the like. In one embodiment, at least one I/O device is a storage device (e.g., one or more network interface devices, a disk drive, an optical disk drive, a floppy disk drive). It should be understood that the social networking module 505 can be implemented as a physical device or subsystem that is coupled to a processor through a communication channel.

Alternatively, the social networking module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the social networking module 505 for social networking in a dynamic environment described herein with reference to the preceding Figures can be stored on a computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for social networking in a network, comprising:
broadcasting via a first device a first set comprising a keyword representing an interest of a first user in the network together with a proposed method for selecting a server in the network;
receiving a response from a second device operated by a second user in the network, the response indicating an interest in the interest of the first user; and
connecting, by the first device, to a server by selecting the server in the network in accordance with the proposed method for selecting the server in the network, where the server is for hosting a first group for supporting a communication between the first device and the second device, wherein the selecting the server comprises:
determining whether one or more servers in the network are already hosting a second group similar to the first group;
selecting one of the one or more servers already hosting the second group that has a lowest internet protocol address, if one or more servers in the network are already hosting the second group similar to the first group or otherwise offer to host communications for a group similar to the first group; and
determining whether one or more servers in the network is capable of host the first group, if no servers in the network are already hosting the second group similar to the first group.

2. The method of claim 1, wherein the broadcasting further comprises broadcasting an indication as to whether the first device is capable of hosting the first group.

3. The method of claim 1, wherein the response includes a second set comprising a second keyword representing an interest of the second user.

4. The method of claim 3, wherein the second set is identical to the first set.

5. The method of claim 3, wherein the second set is a subset of the first set.

6. The method of claim 3, wherein the second set is a superset of the first set.

7. The method of claim 1, wherein the response includes an indication as to whether the second device is capable of hosting the first group.

8. The method of claim 1, wherein the response includes an internet protocol address and a port on the second device, the internet protocol address and the port being reserved for the communication.

9. The method of claim 1, wherein the server is the first device.

10. The method of claim 1, wherein the selecting the server further comprises:
selecting one of the one or more servers that is capable of hosting the first group that has a lowest internet protocol address, if one or more servers in the network is capable of hosting the first group; and
becoming a default host of the first group, if no servers in the network is capable of hosting the first group.

11. The method of claim 1, wherein the first user and the second user remain substantially anonymous to each other.

12. The method of claim 1, wherein an internet protocol address of the first device is assigned dynamically.

13. The method of claim 1, wherein the response includes an indication as to whether the second device is already hosting a second group similar to the first group.

14. The method of claim 1, wherein the server is the second device.

15. The method of claim 1, wherein an Internet protocol address of the second device is assigned dynamically.

16. A system for social networking, comprising:
- a first user device for broadcasting a first set comprising a keyword representing an interest of a first user in a network together with a proposed method for selecting a server in the network;
- a second user device for sending a response from a second user in the network to the first user device, the response indicating an interest in the interest of the first user; and
- the server being selected for hosting a group for supporting a communication between the first user and the second user in accordance with the proposed method, wherein the selecting the server comprises:
  - determining whether one or more servers in the network are already hosting a second group similar to the first group;
  - selecting one of the one or more servers already hosting the second group that has a lowest internet protocol address, if one or more servers in the network are already hosting the second group similar to the first group or otherwise offer to host communications for a group similar to the first group; and
  - determining whether one or more servers in the network is capable of hosting the first group, if no servers in the network are already hosting the second group similar to the first group.

17. The system of claim 16, wherein the server is the first user device.

18. The system of claim 16, wherein an internet protocol address of the first user device is assigned dynamically.

19. The system of claim 16, wherein the first user and the second user remain substantially anonymous to each other.

20. A device for social networking in a network, comprising:
- a processor; and
- a computer-readable medium in communication with the processor, wherein the computer-readable medium has stored thereon a plurality of instructions, the plurality of instructions including instructions which, when executed by the processor, cause the processor to perform a method, comprising:
  - broadcasting a first set comprising a keyword representing an interest of a first user in the network together with a proposed method for selecting a server in the network;
  - receiving a response from a second device operated by a second user in the network, the response indicating an interest in the interest of the first user; and
  - connecting, to a server, by selecting the server in the network in accordance with the proposed method for selecting the server in the network, where the server is for hosting a first group for supporting a communication between the first device and the second device, wherein the selecting the server comprises:
    - determining whether one or more servers in the network are already hosting a second group similar to the first group;
    - selecting one of the one or more servers already hosting the second group that has a lowest internet protocol address, if one or more servers in the network are already hosting the second group similar to the first group or otherwise offer to host communications for a group similar to the first group; and
    - determining whether one or more servers in the network is capable of host the first group, if no servers in the network are already hosting the second group similar to the first group.

* * * * *